UNITED STATES PATENT OFFICE.

EDWARD J. DE SMEDT, OF WASHINGTON, DISTRICT OF COLUMBIA.

BITUMINOUS CEMENT.

SPECIFICATION forming part of Letters Patent No. 236,995, dated January 25, 1881.

Application filed December 21, 1880. (No specimens.)

*To all whom it may concern:*

Be it known that I, EDWARD J. DE SMEDT, of the city of Washington, District of Columbia, have invented certain new and useful Improvements in Bituminous Cements, used for paving and other purposes, of which the following is a specification.

My invention has originated in the effort to cure a certain defect noticeable in that class of pavements commonly known as "bituminous-concrete," or "asphalt," or "bituminous" pavements, and it is directed chiefly to that end. It is, however, applicable generally to bituminous cements used not only for paving but for other purposes.

It is a well-established fact that the relatively quick destruction or deterioration of a bituminous pavement is due, in part, to the evaporation of certain volatile hydrocarbons during the heat of summer, but chiefly to the gradual oxidation of the bituminous substances used as the matrix, which after a certain time changes the nature of the matrix and produces, to a greater or less extent, disintegration. It is my object to prevent, after the pavement has once been laid, any appreciable change of this kind in the matrix.

Coal-tar products are much more subject to oxidation by atmospheric air and other natural influences than are the asphalt products; but the coal-tar products have certain qualities which asphalts do not possess, and which are also lacking in the residuum resulting from the distillation of petroleum, which residuum is also now employed in making asphaltic cements. These qualities are adhesiveness and great tensile strength, coupled with impermeability resulting from a lack of affinity for moisture, and they combine to render the coal-tar products a particularly valuable element in a bituminous cement. It becomes, therefore, a desideratum to so prepare these products, preliminarily to their use in a bituminous cement, that they shall not thereafter be liable to appreciable evaporation or oxidation under the natural influences to which the cement may be subjected during its period of use, and it is to this end that my invention is directed.

My invention consists in subjecting the coal-tar products obtained as a residuum by the distillation of coal-tar, and called in the trade by various numbers—*e. g.*, "No. 2," "No. 4," and so on—while in a heated and melted condition, to the action of an oxidizing agent, or an agent which will readily give up its oxygen to the said products when brought in contact therewith. I prefer to maintain the heat at, say, about 300° Fahrenheit, inasmuch as I thereby obtain two results. I bring the coal-tar products to a condition in which they will more readily combine with the oxidizing agent to produce the reaction, and I at the same time drive off or evaporate from said products oils volatile under 200° Fahrenheit. Taking Washington city as an example, bituminous pavements are not heated by the summer-heat at any time beyond 160° Fahrenheit, and by driving off from the coal-tar products oils which become volatile under 200° Fahrenheit I remove therefrom the constituents which would otherwise be liable to evaporate from the pavement after it was laid.

The manner in which I proceed in order to carry out my invention is as follows: The proper coal-tar product is placed in suitable known apparatus, and is there heated to, say, about 300° Fahrenheit, at which temperature it is maintained for twenty-four hours, more or less, in order to drive off oils volatile under 200° Fahrenheit. I do not wish, however, to be understood as restricting myself to these figures. For instance, by maintaining the product a longer time at a somewhat lower temperature the same, or approximately the same, result might be obtained. During this process of evaporation I oxidize more or less completely the coal-tar product. This I do by adding to said product, in proper quantity, a substance which will readily give up its oxygen, of which substances there are many—for instance, permanganate of potash, or preferably permanganic acid ($Mn_2O_7$.) The agent, which we will suppose to be permanganic acid, either powdered or in solution, is added gradually and in small quantities, and is thoroughly stirred into the heated coal-tar product in order to insure a perfect mixture. The permanganic acid in contact with the coal-tar product is transformed into sesquioxide of manganese ($Mn_2O_3$) by the loss of four atoms of oxygen, which combine with the coal-tar product. In my experience I have found one pound of permanganic acid to be a sufficient quantity for the necessary oxidation of one ton of the coal-tar products before named. The coal-tar bitumen thus oxidized may be added in various proportions to asphaltic preparations or cements. It gives to them a greater tenacity and renders them, or the pavement or other compositions into which they enter, less brittle and less liable to be affected by air or water.

I remark that it is not necessary, nor perhaps desirable, to entirely oxidize the coal-tar product. This would approximate it too closely to an asphalt and would impair its tenacity and tensile strength. For practical purposes, and with a view to its use in pavements and the like, it is only necessary to carry the process far enough to insure that there shall be no appreciable oxidation during the life-time of the pavement.

It is manifest, as has been hereinbefore mentioned, that, besides permanganate of potash or permanganic acid, there are other known substances which can also be used, some of which—for instance, picric acid, $C_{12}H_2(NO_4)_3OHO$—are preferable, on some accounts, to permanganic acid. The substances referred to give up their oxygen freely in the presence of the coal-tar products under the conditions before mentioned, while they do not decompose or exercise a destructive effect, as some acids (such as sulphuric, nitric, and chromic acids) do, upon the material. Of the acids last named, chromic acid, for instance, or its compounds, such as bichromate of potash, exercises a destructive effect upon the material, a portion of its oxygen uniting with the carbon of the coal-tar to form carbonic acid, and another portion of its oxygen uniting with the hydrogen of the coal-tar to form water. In other words, it acts to decompose the material and to unite with the separate elements of the latter, and not to oxidize the material itself and leave it otherwise unchanged.

The oxidized product herein described may be used, either alone or in conjunction with other bituminous substances, not only for paving, but for roofing, coating iron, &c.

I remark, in conclusion, that I can use the oxidized product herein described in combination with known oxygenated heavy hydrocarbon oils, whether with or without additional substances, in making a composition or cement for paving and other purposes.

Having described my invention, what I claim, and desire to secure by Letters Patent, is—

1. The hereinbefore-described improvement in the art of preparing coal-tar products for use in bituminous cements or compositions for paving and other purposes, which consists in subjecting said products, while maintained in a heated condition, to the action of an oxidizing agent, substantially as specified.

2. The process of treating coal-tar products for paving and other purposes, which consists in maintaining said products at a temperature of about 300° Fahrenheit for about the period of time specified, and adding to and intermingling with said products while so heated an oxidizing agent, substantially as specified.

3. The oxidized coal-tar product hereinbefore described.

4. The application and use, in the manufacture of bituminous cements for paving and other purposes, of coal-tar products deprived of their more volatile oils and oxidized, substantially as and for the purposes hereinbefore set forth.

In testimony whereof I have hereunto set my hand this 20th day of December, 1880.

E. J. DE SMEDT.

Witnesses:
E. A. DICK,
M. BAILEY.